(12) United States Patent
Ioka

(10) Patent No.: US 6,883,893 B2
(45) Date of Patent: Apr. 26, 2005

(54) IMAGE RECORDING APPARATUS

(75) Inventor: Ken Ioka, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/863,879

(22) Filed: Jun. 9, 2004

(65) Prior Publication Data
US 2005/0001871 A1 Jan. 6, 2005

Related U.S. Application Data

(63) Continuation of application No. PCT/JP02/13017, filed on Dec. 12, 2002.

(30) Foreign Application Priority Data

Dec. 13, 2001 (JP) .......................................... 2001-380382

(51) Int. Cl.[7] .......................... B41J 29/393; B41J 29/38; B41J 2/155
(52) U.S. Cl. ................................ 347/19; 347/9; 347/42
(58) Field of Search ................................ 347/9, 19, 41, 347/42

(56) References Cited

U.S. PATENT DOCUMENTS 6,283,650 B1   9/2001   Yamada et al.
6,547,355 B1 * 4/2003   Shimada et al. ............... 347/12

FOREIGN PATENT DOCUMENTS

| EP | 0 822 511 A2 | 2/1998 |
| JP | 2000-168109 A | 6/2000 |
| JP | 2001-162912 A | 6/2001 |
| JP | 2002-103597 A | 4/2002 |

* cited by examiner

Primary Examiner—Stephen D. Meier
Assistant Examiner—Alfred Dudding
(74) Attorney, Agent, or Firm—Frishauf, Holtz, Goodman & Chick, P.C.

(57) ABSTRACT

There is disclosed an image recording apparatus comprising an input image memory, a temporary memory, a position memory to store a transfer start position in the input image memory and a transfer destination position in the temporary memory and an overlapping width between recording heads for each nozzle in a case where some of images recorded in the input image memory are transferred to the temporary memory, a scanner, a position calculation section which calculates the transfer start position and the transfer destination position and the overlapping width from read test pattern data, and an image transfer section which transfers the images of the input image memory to the temporary memory in accordance with the transfer start position of the position memory.

3 Claims, 4 Drawing Sheets

IMAGE RECORDING APPARATUS

CROSS REFERENCE TO RELATED APPLICATIONS

This is a Continuation Application of PCT application No. PCT/JP02/13017, filed Dec. 12, 2002, which was not published under PCT Article 21(2) in English.

This application is based upon and claims the benefit of priority from prior Japanese Patent Application No. 2001-380382, filed Dec. 13, 2001, the entire contents of which are incorporated herein by reference.

BACKGROUND OF THE INVENTION

1. Field of the Invention

The present invention relates to an image recording apparatus in which a plurality of recording heads are joined to form a composite recording head having a large recording width and an image is recorded, particularly to an image recording apparatus in which a positional shift is not caused between recorded images printed by the respective recording heads although the recording heads are not accurately positioned.

2. Description of the Related Art

In a conventional art, as described in an image correction device of Jpn. Pat. Appln. KOKAI Publication No. 2000-168109, to eliminate a positional shift caused in recording an image using a composite recording head comprising a plurality of recording heads, correction has heretofore been performed using a special image device which performs geometric correction with respect to multivalued input image data.

However, the above-described Jpn. Pat. Appln. KOKAI Publication No. 2000-168109 is not suitable for a high-speed printer, because time-consuming geometric correction needs to be performed with respect to input multivalued image data. Since a device is required for the geometric correction of the multivalued image data, there has been a disadvantage that a recording apparatus becomes expensive.

BRIEF SUMMARY OF THE INVENTION

An object of the present invention is to consider the above-described problems and to provide an image recording apparatus in which an image transfer position of a storage section for storing image information is changed in accordance with a positional shift between nozzles in printing binarized input image data with each nozzle of a recording head, so that multivalued image geometric correction described above is not required.

According to a first aspect of the present invention, there is provided an image recording apparatus which prints an image using a composite recording head formed by joining a plurality of recording heads having a plurality of nozzles to discharge ink so as to have an overlapping region in about the same direction as an arrangement direction of the nozzles, the image recording apparatus comprising: an input image storage section which stores whole image information input into the image recording apparatus; a temporary image storage section into which the image information for a recording width printable by each recording head in the image information stored in the input image storage section is transferred and temporarily stored; a test pattern reading section which reads a test pattern printed by the composite recording head; a position information calculation section which calculates position information including a transfer start address and a transfer destination address of each storage section and a width of the overlapping region for use in transferring the image information into the temporary image storage section from the input image storage section from information of the read test pattern; and a position information storage section which stores the position information calculated by the position information calculation section.

Moreover, an image recording apparatus according to a second aspect of the present invention relates to the image recording apparatus according to the first aspect of the present invention, and further comprises a mask pattern production section which generates a mask pattern to mask the transferred image information by a dot unit so as to prevent the nozzles from discharging the ink, and the recording head prints the image based on the image information via the mask pattern.

Furthermore, an image recording apparatus according to a third aspect of the present invention relates to the image recording apparatus according to the first aspect of the present invention, and comprises a plurality of composite recording heads, and the respective composite recording heads record inks in different colors.

DETAILED DESCRIPTION OF THE INVENTION

Embodiments of the present invention will be described hereinafter with reference to the drawings.

Figure 1:
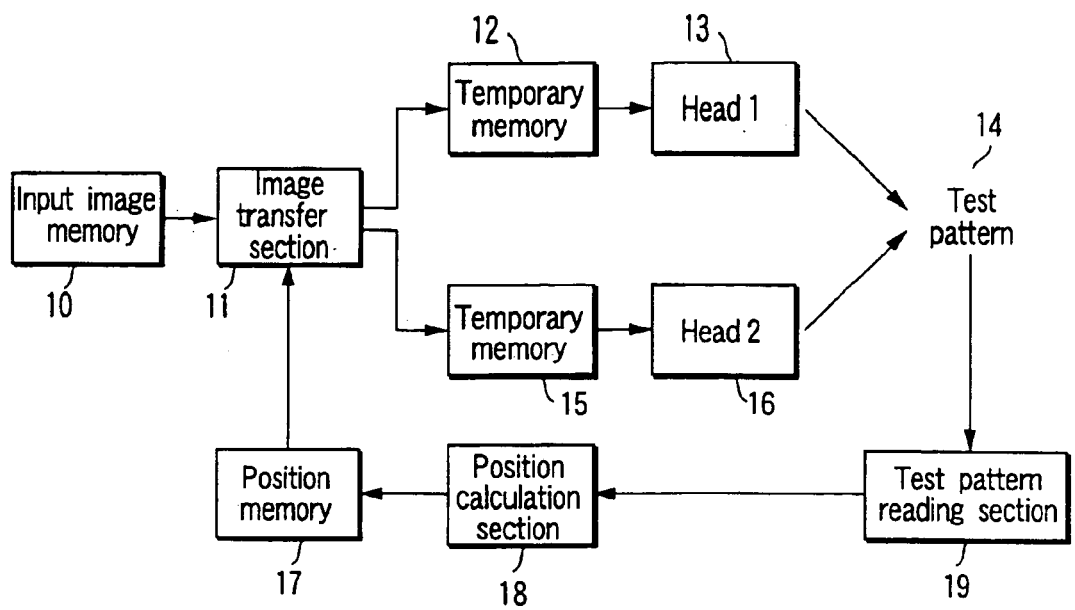
FIG. 1 is a diagram showing a constitution according to a first embodiment of the present invention.
Figure 4:
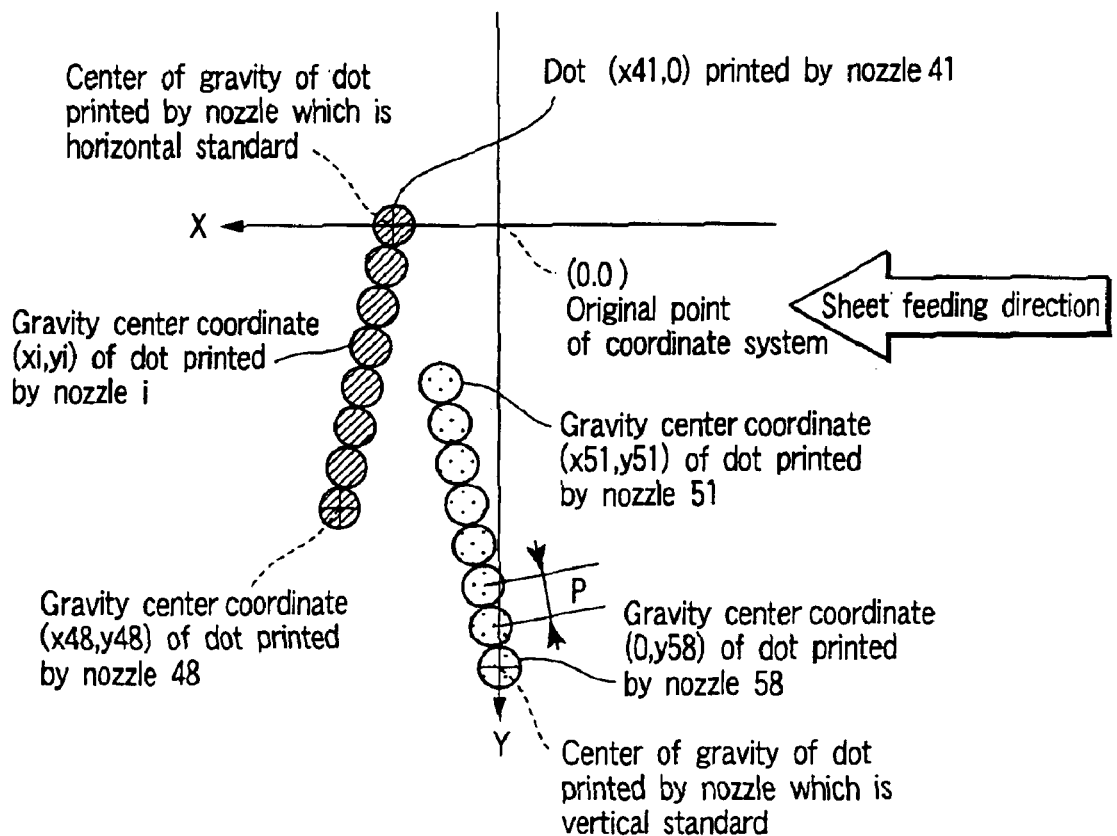
FIG. 4 is an explanatory view showing a process in which a test pattern reading section according to the embodiment of the present invention analyzes read image data to obtain a relative positional relationship of nozzles.

FIG. 1 is a diagram showing a constitution of a first embodiment of the present invention. As shown in FIG. 1, first, binary test pattern image data of a straight line extending in an arrangement direction of nozzles of a first head (hereinafter referred to as the head (1) 13) and a second head (hereinafter referred to as the head (2) 16) is input into an input image memory 10. At this time, in a position memory 17, a transfer start position in which correction of a positional shift between the heads (1) 13 and (2) 16 is not considered (address on a memory indicating a top position of each line during the reading from the input image memory 10), a transfer destination position (address on the memory indicating the top position of each line during writing into temporary memories 12, 15), and a width of the overlapping region (initial value is 0) are stored. An image transfer section 11 refers to the position information stored in the position memory 11, and transfers input test pattern image data to two temporary memories 12, 15 via the image transfer section 11 to print a test pattern in the heads (1) 13 and (2) 16. Moreover, a test pattern 14 (see FIG. 4) printed in this manner is read by test pattern reading sections 19 such as a scanner and a digital camera, and the read image data is analyzed by a position calculation section 18. By this analysis, as shown in FIG. 4, a relative position relationship between nozzles is obtained, and the transfer start position in the input image memory 10, the transfer destination positions in the temporary memories 12, 15, and the width of the overlapping region between the heads (1) 13 and (2) 16 are calculated from this position relationship to rewrite values stored in the position memory 17. It is to be noted that details of a calculation method will be described later with reference to FIG. 4. When an actual image other than the test pattern is printed, binarized image data is input into the input image memory 10, the position information stored in the position memory 17 is read, and the input image data is accordingly transferred to the temporary memories 12, 15, and printed by the heads (1) 13 and (2) 16.

Figure 2:
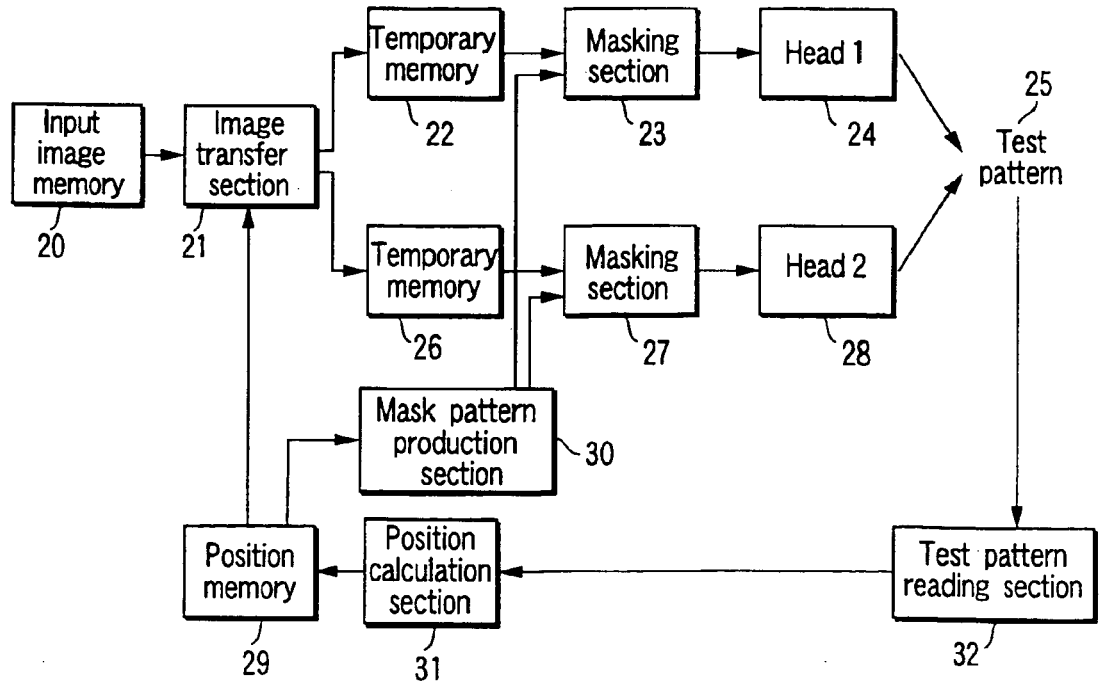
FIG. 2 is a diagram showing a constitution according to a second embodiment of the present invention.

Next, FIG. 2 is a diagram showing a constitution of a second embodiment of the present invention. As shown in FIG. 2, first, binary test pattern image data of a straight line extending in an arrangement direction of nozzles of heads (1) 24 and (2) 28 is input into an input image memory 20. At this time, in a position memory 29, a transfer start position in which the correction of the positional shift between the heads (1) 24 and (2) 28 is not considered (address on the memory indicating the top position of each line during the reading from the input image memory 20), a transfer destination position (address on the memory indicating the top position of each line during writing into temporary memories 22, 26), and the width of the overlapping region (initial value is 0) are stored. An image transfer section 21 refers to the position information stored in the position memory 29, and transfers input test pattern image data to two temporary memories 22, 26 via the image transfer section 21.

Moreover, a mask pattern production section 30 generates a mask pattern capable of transferring the image data as such without masking the data, and subsequently transfers the pattern to masking sections 23, 27. Furthermore, the mask pattern is adapted to the data (as such here) in the masking sections 23, 27 which have received the image data from the temporary memories 22, 26, and printed by the heads (1) 24 and (2) 27.

Figure 7:
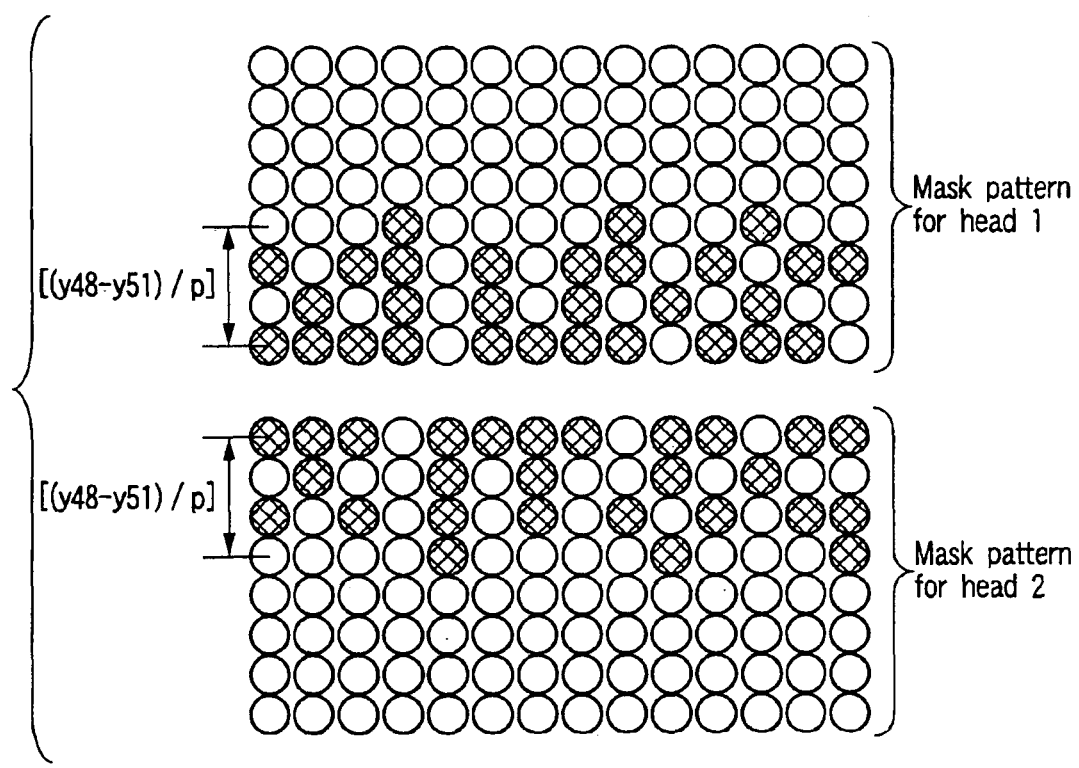
FIG. 7 is an explanatory view of a mask pattern according to the embodiment of the present invention.

Furthermore, a test pattern 25 (see FIG. 4) printed in this manner is read by test pattern reading sections 32 such as a scanner and a digital camera, and the read image data is analyzed by a position calculation section 31. By this analysis, as shown in FIG. 4, a relative position relationship between nozzles is obtained, and the transfer start position in the input image memory 20, the transfer destination positions in the temporary memories 22, 26, and the width of the overlapping region between the heads (1) 24 and (2) 28 are calculated from the position relationship to rewrite values stored in the position memory 29. When an actual image other than the test pattern is printed, binarized image data is input into the input image memory 20, the position information stored in the position memory 29 is read, and the input image data is accordingly transferred to the temporary memories 22, 26. Moreover, in the mask pattern production section 30, as shown in FIG. 7, the mask patterns for the heads 1 and 2 are generated.

The mask pattern has a size equal to that of the temporary memory for each head, white dots pass the image data in the corresponding position as such, and hatched dots mean that the image data of the corresponding position is converted to data which is not to be printed. The mask patterns of the heads 1 and 2 are prepared in such a manner that a portion other than an overlapping portion is the white dot, and the hatched dots are complementary by two heads in the overlapping portion.

The prepared mask patterns are transferred to the masking sections 23, 27. Furthermore, the mask patterns are adapted to the data in the masking sections 23, 27 which have received the image data from the temporary memories 22, 26, and only the dots to be printed are printed by the heads (1) 24 and (2) 27.

Figure 3:
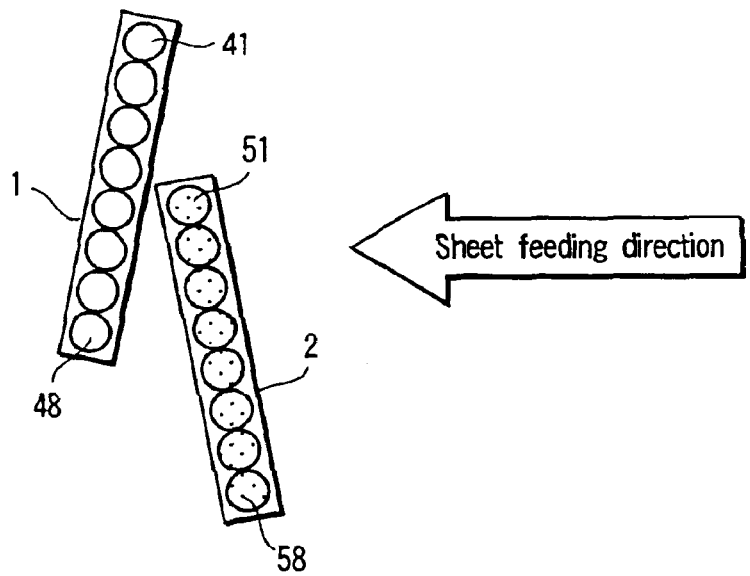
FIG. 3 is a diagram showing a recording head formed by overlapping and joining heads (1) and (2) according to the embodiment of the present invention.

Next, FIG. 3 is a schematic diagram showing a composite recording head formed by joining a plurality of recording heads (1) and (2) so as to have an overlapping region in about the same direction as the arrangement direction of the nozzles. The recording heads (1) and (2) are not accurately positioned, and are arranged in inclined states.

FIG. 4 is a diagram showing data obtained by reading the test pattern printed using the recording heads of FIG. 3 by the reading section. A method of obtaining the relative positions of the respective nozzles of the recording heads will be described with reference to FIG. 4. Each of the recording heads 1 and 2 has eight nozzles. A gravity center position of the printed dot is obtained in order to obtain each nozzle position accurately. As shown in FIG. 4, a conveying direction of a sheet is set to an X-axis, a direction crossing this axis at right angles is set to a Y-axis, and the nozzle position of each recording head is obtained from the printed test pattern. In FIG. 4, a coordinate of a nozzle 41 in an end of the recording head 1 is (X41, 0), a coordinate of a nozzle 58 in an end of the recording head 2 is (0, Y58), and a coordinate position of each nozzle is obtained. Here, for example, when the coordinate of a nozzle i is obtained as (Xi, Yi), and a distance between the nozzles (dot pitch P on the printed test pattern) is obtained by calculation of a distance between centers of gravity of adjacent dots. Character i denotes an arbitrary nozzle.

Figure 5:
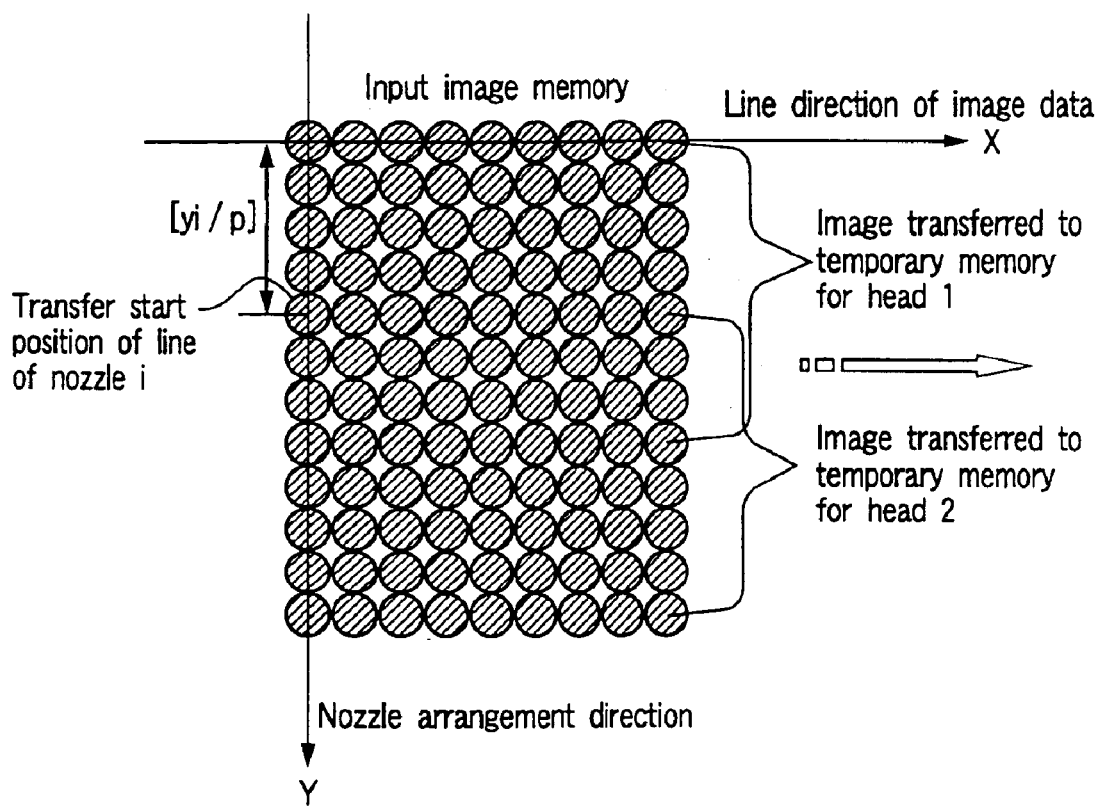
FIG. 5 is a diagram showing a transfer start position corresponding to a nozzle i, assuming that a pitch of a printed dot is P according to the embodiment of the present invention.

Moreover, the transfer start position of the input image memory for the nozzle i of the head 1 and the transfer destination position of the temporary memory will be described with reference to FIGS. 5 and 6. FIG. 5 shows the image data stored in the input image memory. The X-axis indicates a line direction of the image data (i.e., arrangement direction of the image data to be printed in a sheet feed direction), and the Y-axis indicates the arrangement direction of the nozzles. The transfer start position in the input image memory of the nozzle i is a top pixel of a [Yi/P]-th line. It is to be noted that [Yi/P] indicates an integer obtained by rounding a real number Yi/P, and [ ] is used in a similar meaning hereinafter.

Figure 6:
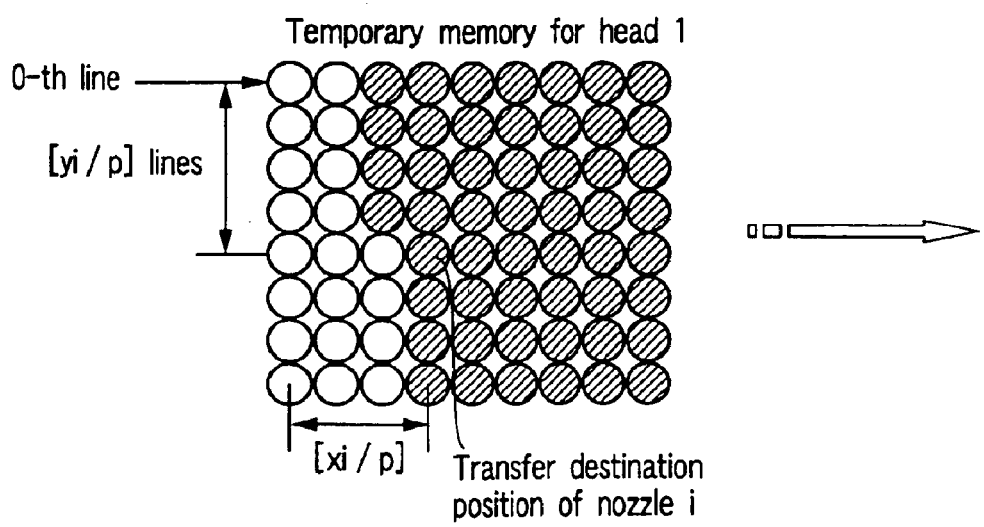
FIG. 6 is an explanatory view of transfer in accordance with the nozzle i according to the embodiment of the present invention.

FIG. 6 shows the temporary memory for a recording head. The transfer destination position of the nozzle i is an [Xi/P]-th position of a [Yi/P]-th line of the temporary memory. That is, pixel data of the [Yi/P]-th line of the input image memory for the nozzle i of FIG. 5 is transferred to an [Xi/P]-th pixel position of the [Yi/P]-th line of the temporary memory in order. In this manner, the pixel data is successively transferred for each line in an X-axis direction. When the pixel data is transferred to the temporary memory from the input image memory in all lines, the transfer ends.

Next, FIG. 7 is an explanatory view of the mask pattern according to the embodiment of the present invention. An upper pattern is an example of the mask pattern for the head 1, a lower pattern is an example of the mask pattern for the head 2, hatched dot positions indicate that any dot is not printed. Since the heads 1 and 2 print the same image in the overlapping region, non-printed dot positions are just reversed in the overlapping region in order to assign the printing between two heads so that double printing is avoided. In the present invention, since the heads are roughly arranged, the width of the overlapping region has to be obtained to accordingly generate an optimum mask pattern in the mask pattern production section. An overlapping width of two heads can be calculated as [(Y48−Y51)/P] from the coordinate of the lowest nozzle of the head 1 and that of the top nozzle of the head 2.

As described above, by the use of the embodiments of the present invention, any time-consuming geometric correction does not have to be performed with respect to the image, and high-speed printing is possible. Furthermore, since any device for the geometric correction is not required, cost of the recording apparatus can be reduced.

According to the present invention, since any geometric correction of a multivalued image does not have to be performed, and any device for the correction is not required, an image recording apparatus can be speeded up, and cost can be reduced.

What is claimed is:

1. An image recording apparatus which prints an image using a composite recording head formed by joining a plurality of recording heads, each having a plurality of nozzles to discharge ink so as to have an overlapping region in about the same direction as an arrangement direction of the nozzles, the image recording apparatus comprising:

an input image storage section which stores whole image information input into the image recording apparatus;

a temporary image storage section into which the image information for a recording width printable by each recording head in the image information stored in the input image storage section is transferred and temporarily stored;

a test pattern reading section which reads a test pattern printed by the composite recording head;

a position information calculation section which calculates position information including a transfer start address and a transfer destination address of each storage section and a width of the overlapping region for use in transferring the image information into the temporary image storage section from the input image storage section from information of the read test pattern; and a position information storage section which stores the position information calculated by the position information calculation section.

2. The image recording apparatus according to claim 1, further comprising:

a mask pattern generating section which generates a mask pattern to mask the transferred image information by a dot unit so as to prevent the nozzles from discharging the ink, and the recording head prints the image based on the image information via the mask pattern.

3. The image recording apparatus according to claim 1, further comprising: a plurality of composite recording heads, wherein the respective composite recording heads record inks in different colors.

* * * * *

UNITED STATES PATENT AND TRADEMARK OFFICE
CERTIFICATE OF CORRECTION

PATENT NO. : 6,883,893 B2 Page 1 of 1
DATED : April 26, 2005
INVENTOR(S) : Ken Ioka It is certified that error appears in the above-identified patent and that said Letters Patent is hereby corrected as shown below:

<u>Title page,</u>
Item [22], PCT Filed, change "Jun. 9, 2004" to -- Jun. 7, 2004 --.

Signed and Sealed this

Fourth Day of April, 2006

JON W. DUDAS
*Director of the United States Patent and Trademark Office*